(12) United States Patent
Furey

(10) Patent No.: US 6,817,932 B2
(45) Date of Patent: Nov. 16, 2004

(54) PORTABLE SURFACE TREATMENT DEVICE

(76) Inventor: James Furey, 13 E. Frances Ave., Morganville, NJ (US) 07751

( * ) Notice: Subject to any disclaimer, the term of this patent is extended or adjusted under 35 U.S.C. 154(b) by 36 days.

(21) Appl. No.: 10/167,842

(22) Filed: Jun. 11, 2002

(65) Prior Publication Data
US 2003/0228834 A1 Dec. 11, 2003

(51) Int. Cl.⁷ .............................................. B24B 23/00
(52) U.S. Cl. ......................................... 451/358; 15/160
(58) Field of Search ................................ 451/358, 359, 451/360; 15/179, 184, 160

(56) References Cited

U.S. PATENT DOCUMENTS

| | | |
|---|---|---|
| 1,578,013 A | 3/1926 | Case |
| 2,554,763 A | 5/1951 | Wickman |
| 2,866,212 A * | 12/1958 | White et al. ................. 15/88 |
| 2,911,660 A * | 11/1959 | Klemas et al. ............... 15/28 |
| 3,343,192 A * | 9/1967 | Goldstein et al. ............ 15/23 |
| 3,790,980 A | 2/1974 | Sylvie |
| 3,793,782 A | 2/1974 | Bowling |
| 4,780,992 A | 11/1988 | McKervey |
| 5,301,472 A | 4/1994 | Lyng |
| 5,353,461 A * | 10/1994 | Enriquez ..................... 15/23 |
| 5,567,197 A | 10/1996 | Evensen |
| 5,947,806 A | 9/1999 | Rhoads |

* cited by examiner

Primary Examiner—Robert A. Rose
(74) Attorney, Agent, or Firm—Daniel Kirshner, Esq.

(57) ABSTRACT

A portable, battery operated sanding or surface treatment device well adapted for use on a backyard barbeque grill. A combination handle/battery compartment extends downward from the horizontal element of an L-shaped bracket. An electric motor which is contained inside a motor casing is provided. The motor casing includes a portion of larger diameter and a portion of smaller diameter. Extending from the end of the motor casing of larger diameter is a rotating drive shaft. Attached to the drive shaft is a cylinder drive of predetermined span. An annular bearing assembly is provided whose external diameter is substantially similar to the predetermined span of the cylinder drive and whose internal diameter is slightly larger than the dimension of the smaller portion of the motor casing. The bearing assembly surrounds the smaller portion of the motor casing and the motor casing is screwed to the vertical portion of the L-shaped bracket. A cylindrical surface treatment member is chosen and positioned over and abuts the cylinder drive and bearing assembly. An appropriate battery is inserted into the handle/battery compartment and is electrically wired to the motor. The surface member is interchangeable. The cylindrical abrasive member is oriented perpendicularly to its handle without the use of gears to change the direction of rotation.

7 Claims, 5 Drawing Sheets

PORTABLE SURFACE TREATMENT DEVICE

FIELD OF THE INVENTION

The present invention relates to a portable sanding and surface treatment device. More particularly, the present invention surface treatment device is battery operated and includes an interchangeable cylindrical abrasive surface treatment or polishing section that surrounds a cylindrical electrical motor.

BACKGROUND OF THE INVENTION

The present invention is a compact, battery operated surface treatment apparatus. One primary objective of this invention is to provide a convenient device for cleaning grease, dirt and grime from the grate of an ordinary backyard barbeque grill. When the weather is nice, people often enjoy relaxing in the outdoors, and grilling meat or vegetables on their outdoor barbeque grill. Grease from the food has a tendency to accumulate on the grate of the grill. Typical prior art devices include wire brushes to manually remove the accumulated grease and grime. This method is difficult, time consuming and requires substantial physical effort (elbow grease to remove the barbeque grease.) It would be an advantage to provide a device which is a compact, motor driven apparatus, that is suitably configured to operate and clean within the confined space that is presented by the typical backyard barbeque grill.

There are several prior art surface treatment devices, none of which include the novel and non-obvious features of the invention presented herein. These prior art device include the following listed United States Patent. U.S. Pat. No. 5,567,197 entitled Apparatus for Sanding and Buffing with a rotating Roller issued to Evensen on Oct. 22, 1996. U.S. Pat. No. 3,793,782 entitled Power Driven Surface Finishing Device issued to Bowling on Feb. 26, 1974. U.S. Pat. No. 2,554,763 entitled Portable Sander Tool issued to Wickman on Jul. 14, 1950. U.S. Pat. No. 5,301,472 entitled Sanding Element and Apparatus issued to Lyng on Apr. 12, 1994. U.S. Pat. No. 5,947,806 entitled Power Sander issued to Rhoads on Sep. 7, 1999. U.S. Pat. No. 3,790,980 entitled Motor Driven Brush issued to Sylvie on Feb. 12, 1974. U.S. Pat. No. 4,780,992 entitled Apparatus for Cleaning Pool Tile issued to McKervey on Nov. 1, 1988.

It is therefore an objective of the present invention to present a convenient device for use on a common backyard barbeque grill which is utilized to clean dirt, grease, food remains and grime from the grill grate.

Another objective of the present device is to provide a device that includes a readily interchangeable abrasive member. Thus, the present invention is readily adaptable to use in a wide variety of surface treatment applications. For example, through the appropriate choice of surface treatment member, the present invention is well suited for other cleaning and sanding applications.

It is further an objective of the present invention to provide a device that is powered by a rechargeable battery for convenient transportation and ease of use in a multitude of indoor and outdoor locations.

It is further an objective of the present invention to provide a device that is compact in size, and whose cleaning member is gearlessly situated in a direction that is perpendicular to its handle, thus is readily adaptable for use in the restricted area presented by the typical backyard barbeque grill.

It is further an objective of the present invention to provide a device that is mechanically simple and thus can be readily manufactured.

Other objectives, advantages and novel features, and further scope of applicability of the present invention will be set forth in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

The present invention is a portable, battery operated sanding or surface treatment device which is particularly well adapted for use on a backyard barbeque grill. A combination handle/battery compartment extends downward from the horizontal element of an L-shaped bracket. An electric motor which is contained inside a motor casing is provided. The motor casing includes a portion of larger diameter and a portion of smaller diameter. Extending from the end of the motor casing of larger diameter is a rotating drive shaft. Attached to the drive shaft is a cylinder drive of predetermined span. An annular bearing assembly is provided whose external diameter is substantially similar to the predetermined span of the cylinder drive and whose internal diameter is slightly larger than the dimension of the smaller portion of the motor casing. The bearing assembly surrounds the smaller portion of the motor casing and the motor casing is screwed to the vertical portion of the L-shaped bracket. A cylindrical surface treatment member is chosen and positioned over and abuts the cylinder drive and bearing assembly. An appropriate battery is inserted into the handle/battery compartment and is electrically wired to the motor, It will be appreciated that the surface member is interchangeable and may be chosen in accordance with the task It will be further appreciated that the device is compact and that the cylindrical abrasive member is oriented perpendicularly to its handle without the use of gears to change the direction of rotation.

DETAILED DESCRIPTION OF THE INVENTION

Figure 1:
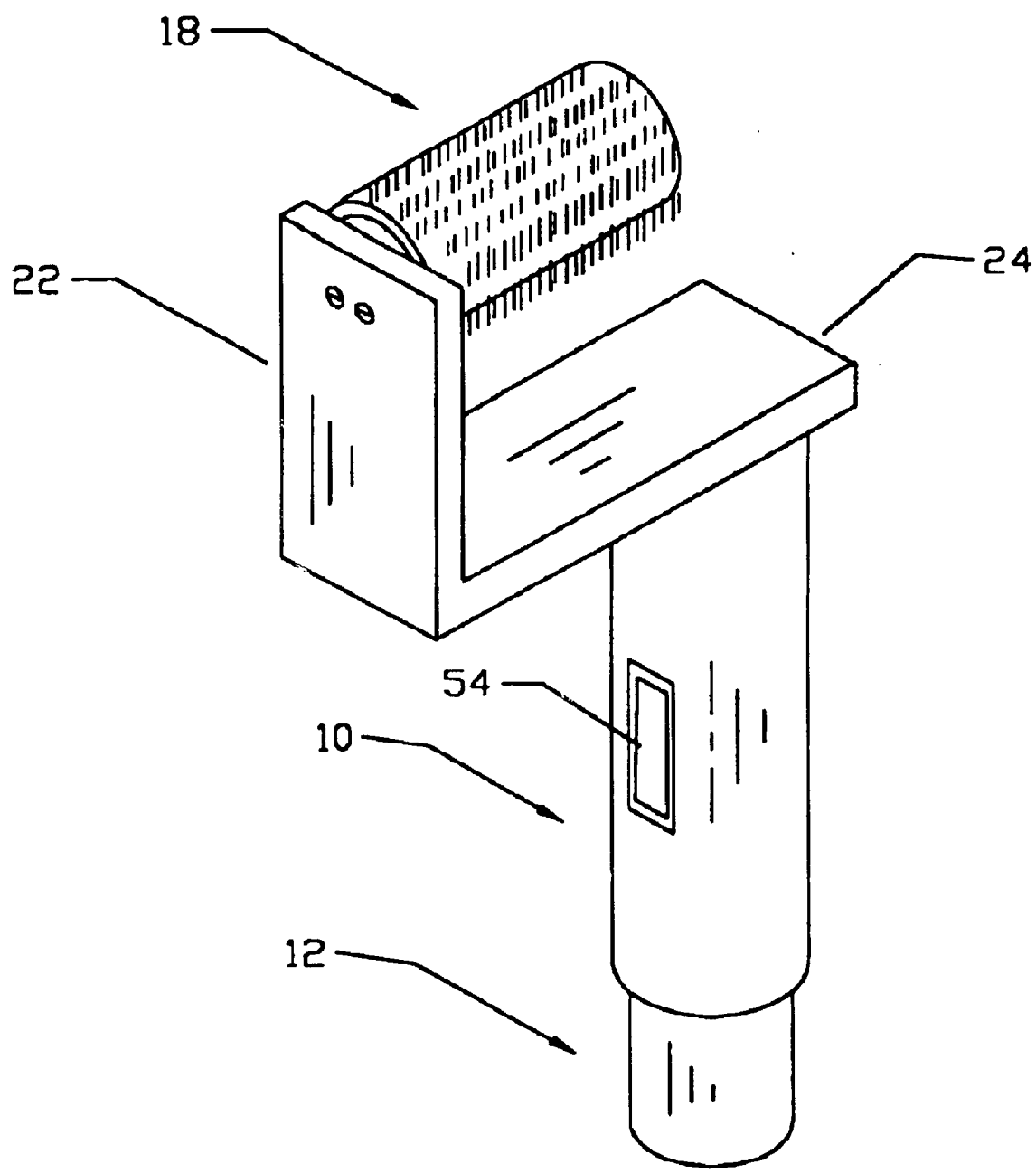
FIG. 1 is an isometric side view of the present invention portable surface treatment device.
Figure 2:
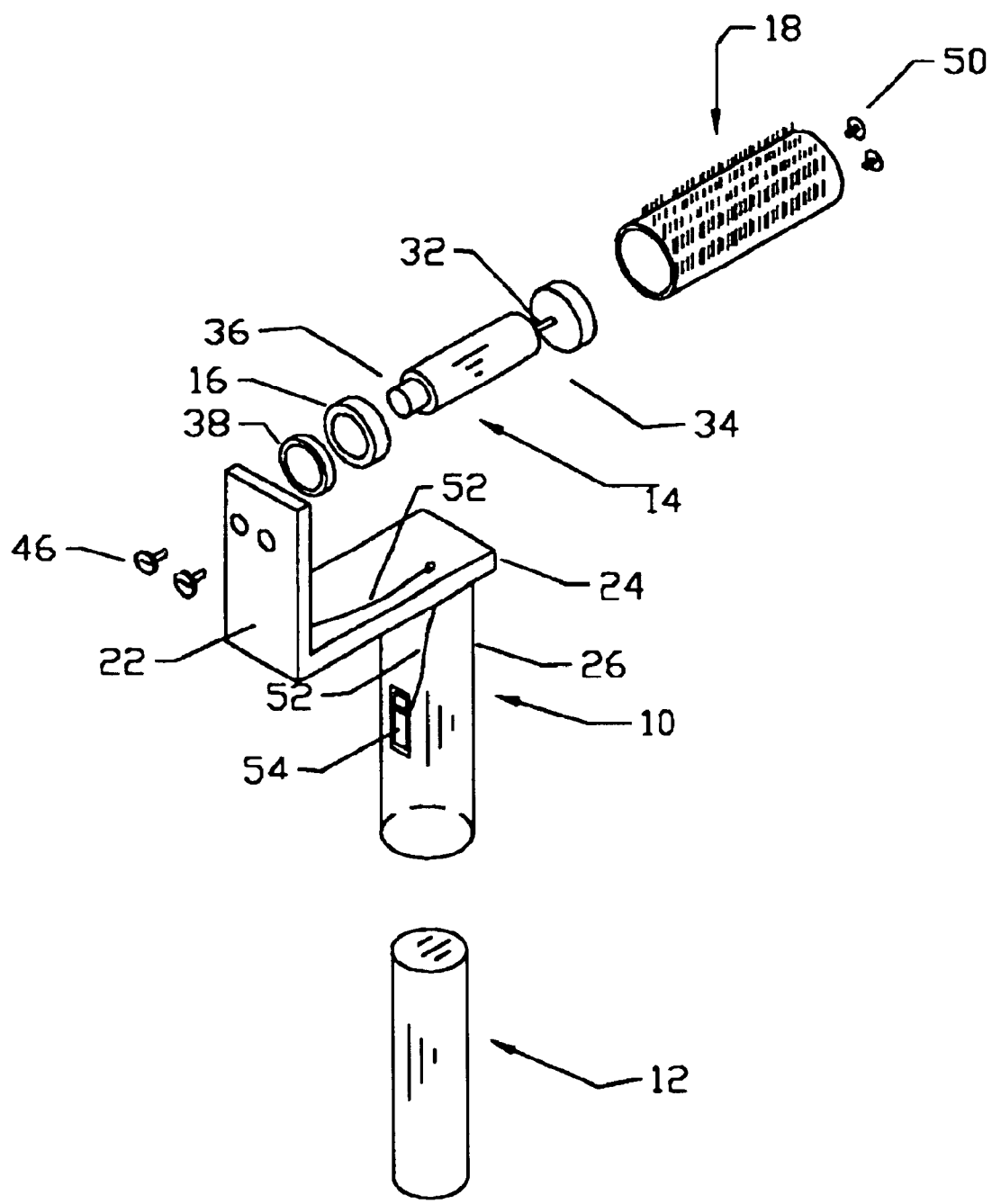
FIG. 2 is an exploded isometric view of the present invention portable surface treatment device.
Figure 3:
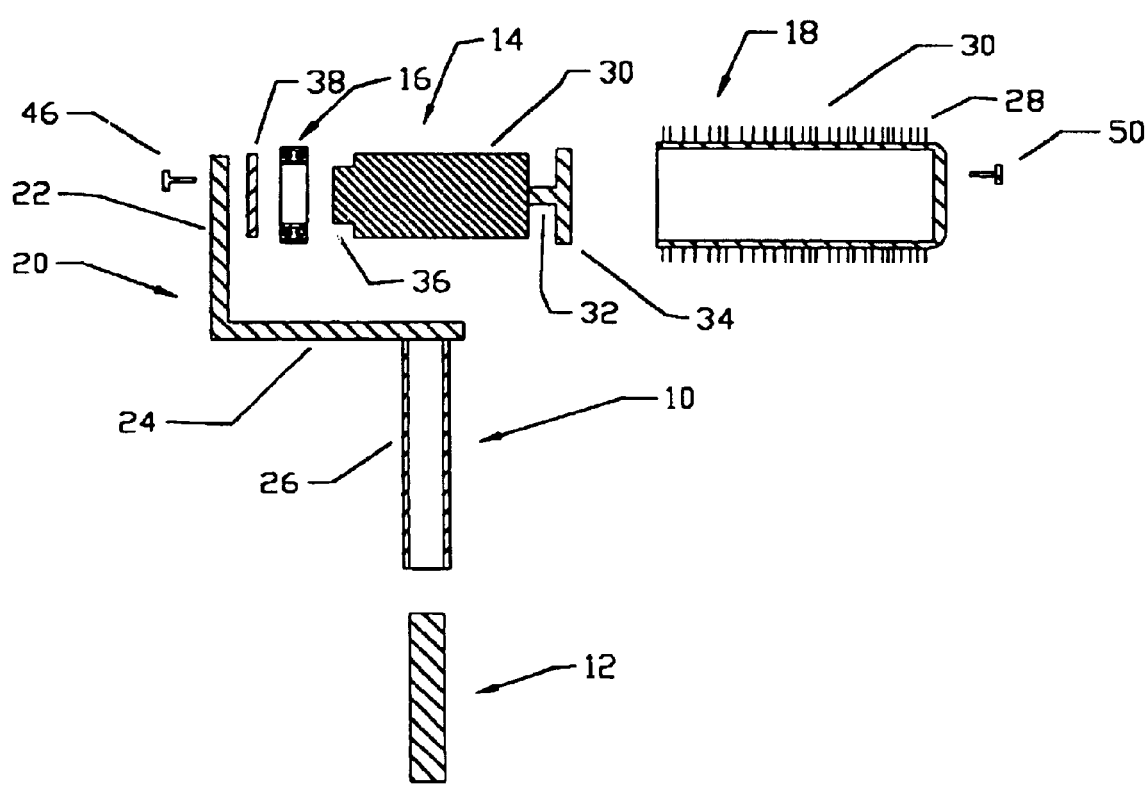
FIG. 3 is a exploded cross sectional view of the present invention portable surface treatment device.
Figure 4:
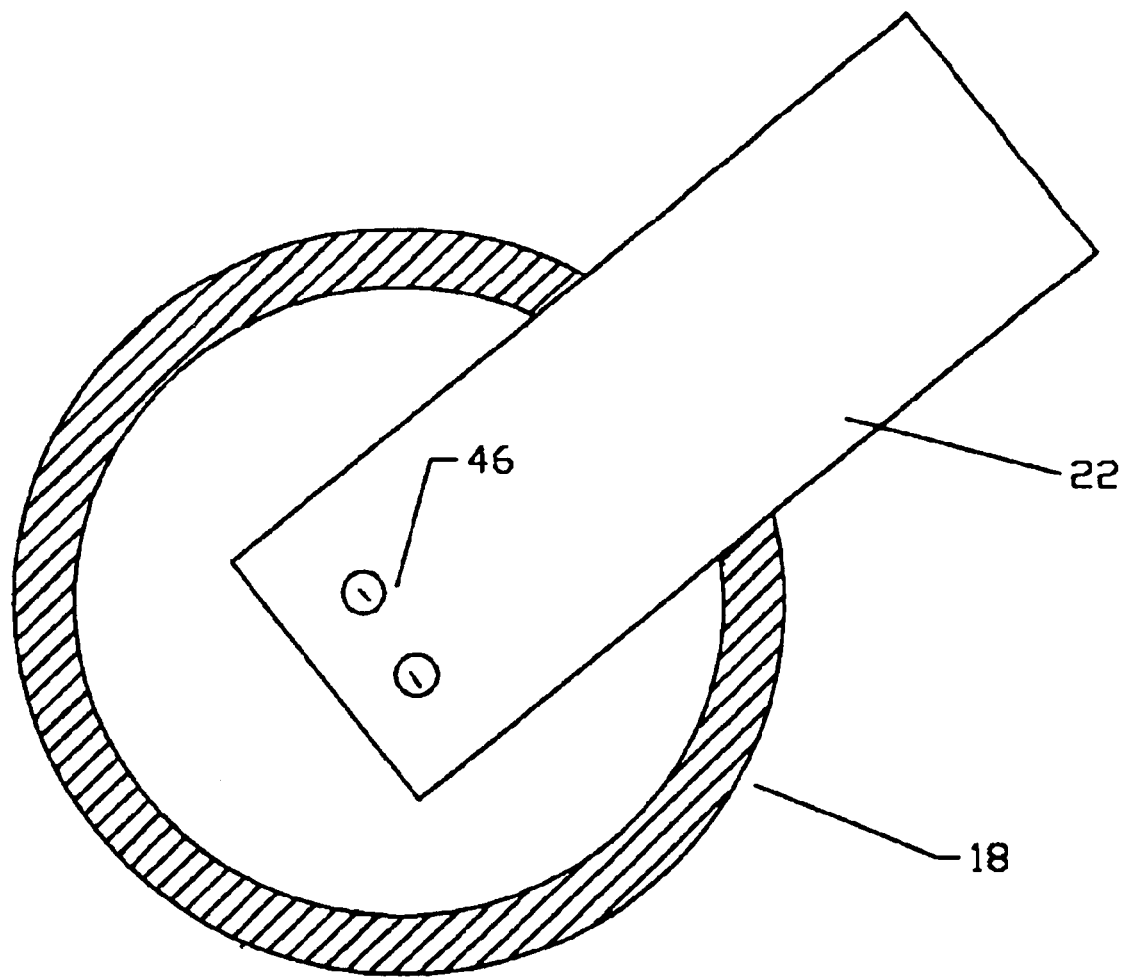
FIG. 4 is a side view of the bracket and cylindrical surface treatment member of the present invention portable surface treatment device.

The present invention is a portable, battery operated sanding or surface treatment device. One application of the embodiment of the invention depicted herein is a device to clean grease and other dirt and grime from the grate of a barbeque grill. As will become evident, the present invention can suitably be adapted for use as a sanding device, paint removal device, or cleaning device in a wide variety of applications.

Referring to FIGS. 1–4, the portable surface treatment device of the present invention is depicted. The portable surface treatment device comprises generally a handle/battery compartment unit 10, a rechargeable battery 12, an electric motor 14, a bearing assembly 16, and a cylindrical abrasive section 18.

The combination handle/battery compartment includes an L-shaped bracket 20 which includes a vertical element 22 and a horizontal element 24. In the preferred embodiment shown herein, the L-shaped bracket 20 is formed from steel, although any other rigid material such as an alternate metal or plastic is within the scope of this disclosure. As shown in the embodiment disclosed herein, the bracket is L-shaped. However, it will be noted that brackets of other configurations are readily possible so long as the bracket serves to position the cylindrical abrasive section 18 in a position that is substantially perpendicular to the handle/battery compartment unit 10.

Extending downward from the horizontal element of the L-shaped bracket is a handle/battery compartment 26. The battery compartment as shown is tubular. As the battery compartment serves to function also as the handle to the device, it should be configured to be comfortably retained in the users hand in an ergonomically desirable manner and finger grips are preferred. Although the battery compartment module is shown being tubular, this is not critical so long as the battery compartment is properly configured to retain the appropriate battery.

Still referring to FIGS. 1–4, a cylindrical abrasive surface treatment member 18 is provided. As is best seen in the cross-section FIG. 3, the surface treatment member is open on the anterior end and is capped on the posterior end. Extending outward from the exterior surface of the surface treatment member is a multitude of wire bristles 28. Alternatively, the exterior surface of the surface treatment member may be lined with sandpaper or other abrasive material and such is within the scope of this disclosure. The capped end of the surface treatment member is provided with screw hole apertures. At the anterior open end is located at least one attachment projection 29 which is formed from an elastic deformable material.

A typical prior art electric motor is provided which is contained in a motor casing 30, which said motor is chosen to operate on the predetermined voltage of the battery 12. The motor may be equipped with gear reduction, said gear reduction achieving a decrease in the rpm's as applied to the rotating drive shaft 32 which extends from the posterior of end of the electric motor casing. Attached to the rotating drive shaft 32 is a cylinder drive 34. As shown in the preferred embodiment, the cylinder drive is a flywheel wherein the flywheel has a dimension chosen to fit snugly within the cylindrical cavity of the abrasive surface treatment member. As shown, the cylinder drive (flywheel) is a disk-like member, although the device will operate successfully if the cylinder drive has other configurations such as a crossbar, triangle or other. Situated at the anterior end of the motor casing is a portion of the motor casing 36 having a second cylindrical dimension which dimension is smaller than the balance of the motor casing 30.

Figure 5:
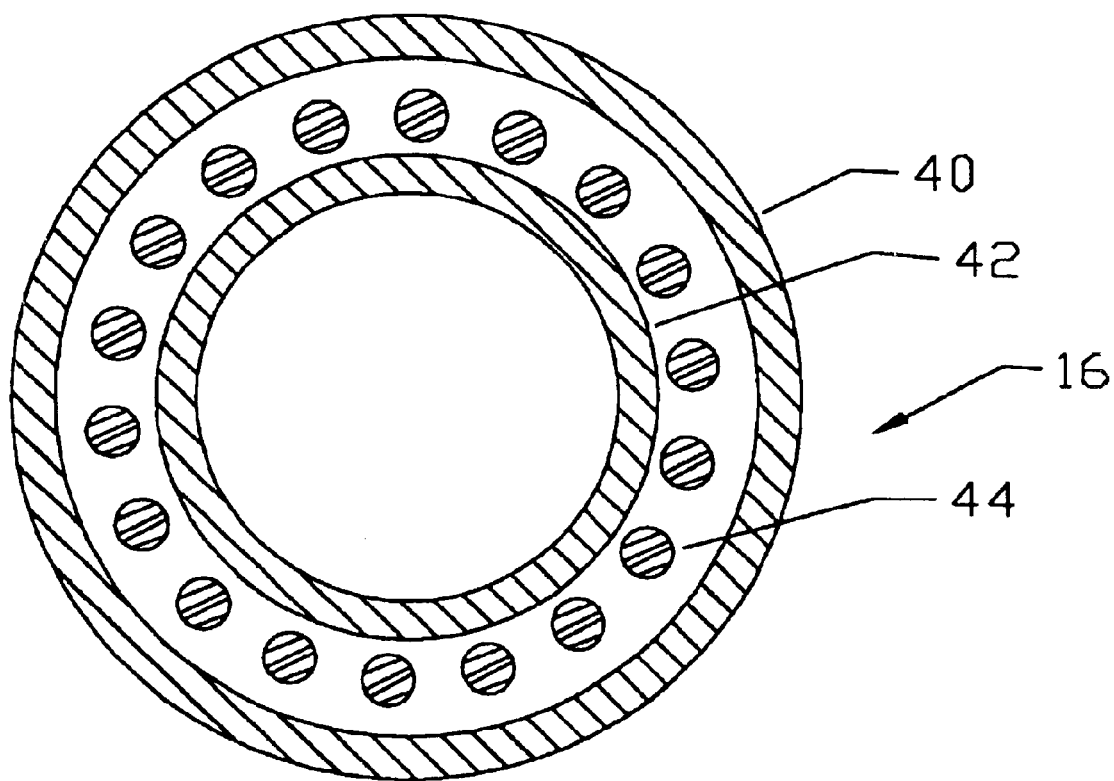
FIG. 5 is a cross sectional view of the bearing assembly of the present invention portable surface treatment device.

A bearing assembly 16 is provided wherein said bearing structure is generally annular, as is best viewed in cross-section by referencing FIG. 5. The bearing assembly comprises an outer disk 40 and an inner disk 42 and is separated by a plurality of ball bearings 44. The bearing assembly has an external diameter substantially similar to the span of the cylinder drive member 34 and an interior diameter slightly larger than the external diameter of the smaller portion of the motor casing 36.

An O-ring 38 is provided which serves to space the bearing assembly 16 from the vertical aspect of the bracket 22. The O-ring should have a diameter that is slightly smaller than the bearing assembly.

Referring back to FIGS. 1–4, it will be appreciated that the device is assembled in the following manner. The smaller portion of the motor casing 36 is inserted through the doughnut hole of the bearing assembly 38. These parts are screwed into place by utilizing one or more screws 46 where the screw or screws are inserted through the screw holes 48 on the L-shaped bracket 20. The screws are then utilized to secure the L-shaped bracket to the motor casing 36. As such, the bearing assembly 38 surrounds the smaller portion of the motor casing 36, but is free to rotate about the longitudinal axis of the motor casing. Finally, a user selects the appropriate cylindrical abrasive section 18. In the embodiment described herein, the intended purpose is for use as a barbeque cleaning apparatus. Thus, the user may select a cylindrical abrasive section 18 that includes wire bristles. Alternatively, if the device is to be utilized as a sander, a cylindrical abrasive section having sandpaper surface or other surface treatment surface may be selected. The cylindrical abrasive section may be screwed to the flywheel utilizing screws 50. The one or more attachment projections 38 are deformed upon insertion of the motor and associated components through the abrasive section 18. The attachment projections are resilient and thus resume their original configuration when the cylindrical abrasive section is in place. As such, the attachment projections abut against the bearing assembly thereby further securing the abrasive section into place.

As can be appreciated from the figures, the cylindrical abrasive section 18 contacts the cylinder drive 34 and the external disk 40 of the bearing assembly 16. As such, rotation from the electric motor is transmitted to the cylindrical abrasive section 18 which rotates about its longitudinal axis. Rotational friction is reduced by the bearing assembly 16. It is evident that the size of the cylindrical abrasive section and the bracket should be appropriately chosen so that the surface of the abrasive section extends beyond the edge of the bracket, as is best revealed in the side view shown in FIG. 4. It is further noted that the cylindrical surface treatment device is oriented generally perpendicular to the handle of the device, and such perpendicular orientation is achieved without the utilization of gears to change the axis of rotation of the motor.

As is well known in the art of portable power tools, a battery 12 is provided. The battery is preferable a rechargeable battery of a predetermined voltage appropriate for the motor and a typical, off-the-shelf prior art battery is suitable. The battery is secured into the battery compartment 26 of the handle. Appropriate wiring 52 powers the unit. A switch 54 selectively turns the device on or off.

It will be appreciated that the portable surface treatment device of the present invention is a small, hand-held device that well adapted for cleaning a barbeque grill or performing other sanding or cleaning chores. Having an interchangeable abrasive cleaning cylinder, the device is adaptable for a variety of applications. Further, because the surface treatment cylinder is oriented in a direction generally perpendicular to its handle, the device is easy to utilize. This surface treatment device is reliable as the direction of rotation perpendicular to the handle is achieved without the need for gears to redirect the axis of rotation. The unit is compact and ergonomically designed due to its non-restrictive motor placement. Moreover, due to its inherent design, use of the device requires a minimum of exertion on the part of the user due to its own weight applying pressure to the surface being treated. Finally, this device can be readily utilized in the confined space typically presented by an outdoor barbeque grill.

What is claimed:

1. A barbeque grill cleaning device comprising:
   an L-shaped bracket having a vertical element and a horizontal element;
   a battery compartment extending downward from said horizontal element of said L-shaped bracket, said battery compartment functioning as a handle;
   an electric motor contained in a casing, said casing comprising a portion of larger diameter and a portion of smaller diameter, said smaller portion attached to said vertical element of said L-shaped bracket;
   a bearing assembly that surrounds said portion of smaller diameter of said casing, said bearing assembly having a predetermined external diameter;
   a cylinder drive extended from said portion of the casing of larger diameter, said cylinder drive having a span of similar diameter to the predetermined external diameter of said bearing assembly; and
   a cylindrical surface treatment member, said surface treatment member having an internal diameter slightly larger than said span of said cylinder drive and said external diameter of said bearing assembly;
   whereby said surface treatment member abuts against said bearing assembly and said cylinder drive thereby transmitting rotational motion.

2. The barbeque grill cleaning device of claim 1 wherein said electric motor is operated by a battery.

3. The barbeque grill cleaning device of claim 2 wherein said battery is a rechargeable battery.

4. The barbeque grill cleaning device of claim 1 wherein said cylindrical surface treatment member includes an abrasive device.

5. The barbeque grill cleaning device of claim 4 wherein said abrasive device includes wire bristles.

6. The barbeque grill cleaning device of claim 1 wherein said cylindrical surface treatment member is interchangeable.

7. A surface treatment device comprising:
   a bracket having a vertical member and a horizontal member,
   an electric motor attached to said vertical member of said bracket, said electric motor having a first end and a second end;
   a bearing assembly that surrounds said first end of said electric motor, said bearing assembly having a predetermined external diameter;
   a cylinder drive that extends out from said second end of said electric motor, said cylinder drive having a span of similar dimension to the predetermined external diameter of said bearing assembly; and
   a cylindrical surface treatment member, said surface treatment member having an internal diameter slightly larger than said span of said cylinder drive and said external diameter of said bearing assembly;
   whereby said surface treatment member abuts against said bearing assembly and said cylinder drive thereby transmitting rotational motion.

* * * * *